United States Patent
Takashima et al.

(10) Patent No.: US 9,574,254 B2
(45) Date of Patent: *Feb. 21, 2017

(54) HOT-ROLLED STEEL SHEET AND METHOD FOR PRODUCING SAME

(71) Applicant: JFE Steel Corporation, Chiyoda-ku, Tokyo (JP)

(72) Inventors: Katsutoshi Takashima, Tokyo (JP); Yuki Toji, Tokyo (JP); Kohei Hasegawa, Tokyo (JP); Shinya Yamaguchi, Tokyo (JP)

(73) Assignee: JFE Steel Corporation

( * ) Notice: Subject to any disclaimer, the term of this patent is extended or adjusted under 35 U.S.C. 154(b) by 261 days.

This patent is subject to a terminal disclaimer.

(21) Appl. No.: 14/346,786

(22) PCT Filed: Sep. 27, 2012

(86) PCT No.: PCT/JP2012/006191
§ 371 (c)(1),
(2) Date: Mar. 24, 2014

(87) PCT Pub. No.: WO2013/046693
PCT Pub. Date: Apr. 4, 2013

(65) Prior Publication Data
US 2014/0299238 A1 Oct. 9, 2014

(30) Foreign Application Priority Data

Sep. 29, 2011 (JP) ................. 2011-215615

(51) Int. Cl.
| | | |
|---|---|---|
| *C22C 38/02* | (2006.01) |
| *C22C 38/04* | (2006.01) |
| *C22C 38/06* | (2006.01) |
| *C22C 38/08* | (2006.01) |
| *C22C 38/14* | (2006.01) |
| *C22C 38/16* | (2006.01) |
| *C22C 38/18* | (2006.01) |
| *C22C 38/26* | (2006.01) |
| *C23C 2/06* | (2006.01) |
| *C21D 9/46* | (2006.01) |
| *C22C 38/12* | (2006.01) |
| *B32B 15/01* | (2006.01) |
| *C22C 38/00* | (2006.01) |
| *C21D 8/02* | (2006.01) |
| *C22C 18/00* | (2006.01) |
| *C22C 18/02* | (2006.01) |

(52) U.S. Cl.
CPC ............ *C22C 38/26* (2013.01); *B32B 15/013* (2013.01); *C21D 8/0263* (2013.01); *C21D 9/46* (2013.01); *C22C 18/00* (2013.01); *C22C 18/02* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C23C 2/06* (2013.01); *C21D 2211/005* (2013.01)

(58) Field of Classification Search
CPC ........ C22C 38/00; C22C 38/001; C22C 38/02; C22C 38/04; C22C 38/06; C22C 38/08; C22C 38/14; C22C 38/16; C22C 38/18; C22C 38/26; C21D 2211/005; C21D 9/46
USPC ........................................ 148/602
See application file for complete search history.

(56) References Cited

U.S. PATENT DOCUMENTS

| 6,364,968 B1 | 4/2002 | Yasuhara et al. | |
|---|---|---|---|
| 9,057,123 B2 * | 6/2015 | Takashima ................ B21B 1/26 148/337 |
| 2007/0029015 A1 * | 2/2007 | Yoshinaga ............. C21D 6/005 148/533 |

FOREIGN PATENT DOCUMENTS

| CN | 101935801 A | 1/2011 |
|---|---|---|
| EP | 1 559 797 A1 | 8/2005 |
| JP | 63-145745 | 6/1998 |
| JP | 2000-212687 | 8/2000 |
| JP | 2004027249 | 1/2004 |
| JP | 3767132 | 4/2006 |
| JP | 2009-293067 | 12/2009 |
| JP | 2011-149066 | 8/2011 |
| WO | WO 2008/078917 A1 | 7/2008 |

(Continued)

OTHER PUBLICATIONS

Supplementary European Search Report for Application No. EP 12 83 5898 dated Apr. 28, 2015.

(Continued)

*Primary Examiner* — Jessee Roe
*Assistant Examiner* — Anthony Liang
(74) *Attorney, Agent, or Firm* — RatnerPrestia

(57) ABSTRACT

A hot rolled steel sheet has a chemical composition including, by mass %, C: 0.060% to 0.120%; Si: 0.10% to 0.70%; Mn: 1.00% to 1.80%; P: 0.10% or less; S: 0.010% or less; Al: 0.01% to 0.10%; N: 0.010% or less; Nb: 0.010% to 0.100%, wherein Nb is contained so that content of solute Nb is 5% or more relative to the total Nb content; the balance being Fe and incidental impurities. The hot rolled steel sheet has a microstructure containing ferrite of not more than 15 μm in average crystal grain diameter by a volume fraction of not less than 75%, the balance being low-temperature-induced phases. The hot rolled steel sheet can be suitably utilized for manufacturing a cold rolled steel sheet or hot-dip galvanized steel sheet having a tensile strength of 590 MPa or more, excellent in material homogeneity and capable of giving excellent cold rolling property.

8 Claims, No Drawings

(56) References Cited

FOREIGN PATENT DOCUMENTS

WO     WO 2010/131303 A1    11/2010

OTHER PUBLICATIONS

Chinese Office Action for Application No. 201280047181.2 dated Apr. 7, 2015 (with English translation).
Taiwan Office Action dated Jul. 4, 2014, application No. 101135857 with English Translation.
Korean Office Action dated Aug. 11, 2015 for Korean Application No. 10-2014-7010740, including English translation.
International Search Report for PCT International Application No. PCT/JP2012/006191 dated Dec. 25, 2012.
Chinese Office Action dated Oct. 22, 2015 for Chinese Application No. 2015101901474480.

* cited by examiner

HOT-ROLLED STEEL SHEET AND METHOD FOR PRODUCING SAME

CROSS REFERENCE TO RELATED APPLICATIONS

This is the U.S. National Phase application of PCT/JP2012/006191, filed Sep. 27, 2012, and claims priority to Japanese Patent Application No. 2011-215615, filed Sep. 29, 2011, the disclosures of each of these applications being incorporated herein by reference in their entireties for all purposes.

FIELD OF THE INVENTION

The present invention relates to a hot rolled steel sheet for manufacturing a cold rolled steel sheet or hot-dip galvanized steel sheet and, in particular, to a hot rolled steel sheet with high yield ratio and excellent material homogeneity and capable of giving excellent cold rolling property, which is suitable, for instance, for members as used in the field of automotive industry. The present invention also relates to a method for producing/manufacturing the same. Here, the term yield ratio (YR) refers to an index representing the ratio of yield strength (YS) relative to tensile strength (TS), which can be expressed as YR=YS/TS.

BACKGROUND OF THE INVENTION

In recent years, for reducing the amount of $CO_2$ emission in view of global environmental protection, there is a strong demand for improved fuel efficiency of automobiles. Thus, there is an active movement toward reduction of the vehicle body weight, by improving the strength of vehicle body members while simultaneously reducing the sheet thickness. To this end, high strength steel sheet having TS 590 MPa or more are widely utilized for manufacturing a cold rolled steel sheet and hot-dip galvanized steel sheet, which are formed into vehicle body members by press working. Moreover, in order to ensure satisfactory collision safety characteristics required for automobiles, enhanced absorption of the collision energy is mandatory. For improving the collision-energy absorbing property, an effective measure is to increase the yield ratio. The higher is the yield ratio, the more effectively can the collision energy be absorbed even with a small volume of deformation.

In this regard, as the mechanism for reinforcing the steel sheet to have a tensile strength of 590 MPa or more, it is known to harden ferrite as the matrix phase or utilize a hard phase such as martensite. Among other things, precipitation-strengthened, high strength steel sheet obtained by adding carbide-forming elements, such as Nb, makes it possible readily to improve the yield ratio and reduce the amount of alloying elements that are required for realizing a predetermined strength, thereby lowering the production cost.

However, there is a problem associated with a high strength cold rolled steel sheet of precipitation-strengthened type that, in the annealing step after hot rolling and subsequent cold rolling, precipitates become sparsely coarse thereby causing a large fluctuation in strength or elongation property. Incidentally, the shape fixability significantly deteriorates by high strengthening the steel sheet and reducing its thickness. Thus, press molds are generally designed taking into consideration an estimated deformation amount of the pressed parts upon their removal from the molds after the press formation. In this instance, if the tensile strength of the steel sheet fluctuates considerably, deviation from an estimated deformation amount based on a constant tensile strength becomes large and tends to cause shape defects requiring each member to be corrected one by one by sheet metal working, etc., thereby leading to significantly low mass-production efficiency. Thus, there is demand for minimizing fluctuation especially in strength of the cold rolled steel sheet and hot-dip galvanized steel sheet, i.e., for achieving an excellent material homogeneity.

As noted above, there are demands for minimizing fluctuation in strength and elongation properties of the cold rolled and hot-dip galvanized steel sheets, and improving the cold rolling property. Further, high strength cold rolled steel sheet is significantly affected by the steel sheet structure and precipitated amounts in the hot rolled steel sheet, so that it would be effective to realize a higher strength of the hot rolled steel sheet. In relation to hot rolled steel sheet, Patent Literature 1 (JP 3767132 B2) discloses a method for manufacturing a hot rolled steel sheet having excellent ductility and material homogeneity by controlling the Nb and Ti contents. On the other hand, Patent Literature 2 (JP 2000-212687 A) discloses a hot rolled steel sheet having improved material homogeneity and hole expansion formability by controlling the Ti content.

PATENT LITERATURE

PTL 1: JP 3767132 B2
PTL 2: JP 2000-212687 A

SUMMARY OF INVENTION

Although Patent Literatures 1 and 2 disclose a method for manufacturing a hot rolled steel sheet having high ductility or hole expansion formability, they fail to pay any attention to a hot rolled material for manufacturing a cold rolled steel sheet focused, in particular, to a cold rolling property, or for manufacturing a hot-dip galvanized steel sheet. Thus, it would be highly desirable to develop a hot rolled steel sheet which is excellent in material homogeneity after annealing, and also in cold rolling property, and which can be suitably utilized as material for manufacturing a cold rolled steel sheet and hot-dip galvanized steel sheet.

Therefore, the present invention aims to solve the problems of the prior art as noted above and provide a hot rolled steel sheet which can be suitably utilized for manufacturing a cold rolled steel sheet or hot-dip galvanized steel sheet having a tensile strength of 590 MPa or more, excellent in material homogeneity and capable of giving excellent cold rolling property.

The inventors conducted extensive study for obtaining a hot rolled steel sheet suitable as members for manufacturing a cold rolled steel sheet or hot-dip galvanized steel sheet that is excellent in material homogeneity and capable of giving excellent cold rolling property and has a high yield ratio, and successfully arrived at a novel recognition as follows. Namely, after completion of hot rolling, when the hot rolled steel sheet is cooled to room temperature condition, if at least 5% of Nb is contained in the steel sheet in a solute condition without being fully precipitated as carbonitride, and the solute Nb in the hot rolled steel sheet is precipitated as carbonitride in successive annealing process, the precipitation of Nb occurs minutely in the steel sheet to suppress fluctuation in strength and elongation properties of the material. It has also been found that, by controlling the average crystal grain diameter of ferrite in a hot rolled steel sheet, it is possible to secure strength after annealing and suppress fluctuation of the material properties.

It has been further found that if the solute Nb is contained by 5% or more in the hot rolled steel sheet and the volume fraction of ferrite is controlled to not less than 75%, an advantageous effect is achieved as follows. That is, it is then possible to prevent an excessive strengthening as a result of precipitation-strengthening, or due to hard phase in the form of low-temperature-induced phases, thereby improving the cold rolling property. Based on such findings, it is possible to create a hot rolled steel sheet which can be suitably utilized as material for manufacturing a cold rolled steel sheet and hot-dip galvanized steel sheet having high yield ratio with stable strength and elongation properties after annealing.

The present invention has been accomplished based on the knowledge and findings as described above.

A first aspect of the present invention resides in a hot rolled steel sheet having a chemical composition including, by mass %, C: 0.060% to 0.120%; Si 0.10% to 0.70%; Mn: 1.00% to 1.80%; P: 0.10% or less; S: 0.010% or less; Al: 0.01% to 0.10%; N: 0.010% or less; Nb: 0.010% to 0.100%, wherein Nb is included so that content of solute Nb is 5% or more relative to the total Nb content; and the balance being Fe and incidental impurities, the steel sheet further having a microstructure with complex phase wherein ferrite with an average crystal grain diameter of not more than 15 μm is contained at a volume fraction of not less than 75%, the balance being low-temperature-induced phases.

A second aspect of the present invention resides in a hot rolled steel sheet according to the first aspect, further including, by mass %, and in place of part of Fe composition, Ti: less than 0.05%.

A third aspect of the present invention resides in a hot rolled steel sheet according to the first or second aspect, further including, by mass %, and in place of part of Fe composition, at least one of V: 0.10% or less, Cr: 0.50% or less, Mo: 0.50% or less, Cu: 0.50% or less, Ni: 0.50% or less, and B: 0.0030% or less.

A fourth aspect of the present invention resides in a hot rolled steel sheet according to any one of the first to third aspects, further including, by mass %, and in place of part of Fe composition, at least one of Ca: 0.001% to 0.005%, and REM: 0.001% to 0.005%.

A fifth aspect of the present invention resides in a hot rolled steel sheet according to any one of the first to fourth aspects, wherein the hot rolled steel sheet is adapted to be utilized for manufacturing a cold rolled steel sheet or hot-dip galvanized steel sheet.

A sixth aspect of the present invention resides in a method for manufacturing a hot rolled steel sheet, the method comprising preparing a steel slab having the composition according to any one of the first to fourth aspects, subjecting the steel slab to hot rolling with a starting temperature within a range of 1150° C. to 1270° C. and a finish rolling final temperature of not less than 900° C., followed by cooling at an average cooling rate within a range of 20° C./s to 90° C./s in a temperature range down to 650° C., and then, upon coiling performed within a range of 470° C. to 640° C., at an average cooling rate within a range of 5° C./s to 30° C./s down to the coiling temperature.

According to the present invention, it is possible to provide a hot rolled steel sheet which can be suitably utilized as material for manufacturing a cold rolled steel sheet and hot-dip galvanized steel sheet excellent in material homogeneity and capable of giving excellent cold rolling property and having a high yield ratio. The cold rolled steel sheet and hot-dip galvanized steel sheet obtained by utilizing the hot rolled steel sheet according to the present invention is suitably applicable, for instance, to vehicle structural members, allowing improvement in fuel efficiency due to reduced weight of the vehicle body while ensuring satisfactory collision safety characteristics required for automobiles. Furthermore, it is also possible to reduce the rolling load during cold rolling, leading to improved mass-production stability.

DESCRIPTION OF PREFERRED EMBODIMENTS

The present invention will be described in further detail hereinafter. First of all, the hot rolled steel sheet according to the present invention has a specific component composition which is limited for the reasons to be described below, where the unit "%" relating to the chemical component elements in the steel refers to "mass %" unless specified otherwise.

<C: 0.060% to 0.120%>

Carbon(C) is an element effectively utilized in high strengthening a steel sheet, and contributes in particular to strengthening the steel sheet by forming minute alloy carbide or alloy carbonitride, together with carbide-formation element, such as Nb. In order to obtain such an effect, carbon must be added by not less than 0.060%. On the other hand, if the carbon content exceeds 0.120%, spot weldability deteriorates, so that the upper limit of the carbon content is defined to be 0.120%. Also, in light of ensuring enhanced weldability, it is preferred that carbon content is defined to be 0.100% or less.

<Si: 0.10% to 0.70%>

Silicon (Si) has high work hardenability to ensure that ductility is relatively not much decreased as the strength is increased, thereby contributing to provide an improved balance between strength and ductility after annealing. In addition, silicon is an element essentially required for improving material homogeneity by promoting ferrite transformation in the hot rolling stage and securing a desired ferrite crystal grain diameter and a desired volume fraction. In order to achieve such an effect, Si content is defined to be 0.10% or more. In order to further improve the material homogeneity, it is preferred that Si content is 0.35% or more. On the other hand, if Si content exceeds 0.70%, the hot-dip galvanizing property deteriorates significantly. Thus, Si content is defined to be 0.70% or less, more preferably 0.60% or less.

<Mn: 1.00% to 1.80%>

Manganese (Mn) is an element contributing to provide improved strength after annealing by solid solution strengthening. In order to achieve such an effect, Mn content needs be 1.00% or more, preferably 1.20% or more. On the other hand, if Mn content exceeds 1.80%, ferrite and pearlite transformations at hot rolling are delayed, making it difficult to secure a desired ferrite crystal grain diameter and a desired volume fraction, and giving rise to concern that the material homogeneity deteriorates. Thus, Mn content is defined to be 1.80% or less, preferably 1.70% or less.

<P: 0.10% or Less>

Phosphorus (P) is an element contributing to provide improved strength by solid solution strengthening. In order to achieve such an effect, it is preferred that P content is 0.005% or more. If P content exceeds 0.10%, segregation into grain boundaries occurs markedly, thereby causing embrittlement of the grain boundaries, besides that weldability degrades and material homogeneity deteriorates. Thus, the upper limit of P content is defined to be 0.10%, preferably 0.05% or less.

<S: 0.010% or Less>

If sulfur (S) content is high, sulfide such as MnS is formed immensely to lower the local elongation as represented by stretch flangeability after annealing. Thus, the upper limit of S content is defined to be 0.010%, more preferably 0.005% or less. It is not particularly necessary to define the lower limit of S content, though ultra low sulfur content leads to increased cost in manufacturing steel. Thus, S content may be reduced within a range of 0.0005% or more.

<Al: 0.01% to 0.10%>

Aluminum (Al) is an element required for deoxidation. In order to achieve such an effect, Al content needs be 0.01% or more. However, since Al content exceeding 0.10% leads to saturation in effect, Al content is defined to be 0.10% or less, preferably 0.05% or less.

<N: 0.010% or Less>

Similarly to C, nitrogen (N) together with Nb forms alloy nitride or alloy carbonitride and contributes to provide improved strength. However, nitride is easily formed at a relatively high temperature and tends to coarsen, providing less contribution to strengthening as compared to carbide. Thus, in order to achieve high strengthening after annealing, it is more effective to reduce N content and form increased amount of alloy carbide. From such viewpoint, N content is defined to be 0.010% or less, preferably 0.005% or less.

<Nb: 0.010% to 0.100%>

Niobium (Nb) is an element required for achieving high yield ratio and high strength after annealing, by forming carbide and carbonitride together with C and N and causing precipitation-strengthening of carbonitride. Also, Nb serves to refine crystal grains during cooling of the hot rolled steel sheet and plays an important role in controlling the ferrite crystal grain diameter and volume fraction for ensuring material homogeneity. In order to achieve such an effect, Nb content needs be 0.010% or more, preferably 0.020% or more. However, when Nb content exceeds 0.100%, carbonitride is formed excessively in the hot rolled steel sheet to degrade the cold rolling property. Thus, the upper limit of Nb content is defined to be 0.100%, preferably 0.080% or less, and further preferably less than 0.050%.

<Solute Nb Content: 5% or More Relative to Total Nb Content>

In order to ensure satisfactory material homogeneity and cold rolling property after annealing, it is important for the solute Nb content of the hot rolled sheet to be 5% or more relative to the total Nb content. If solute Nb content is less than 5% relative to the total Nb content, Nb carbonitride is coarsened unevenly after annealing. In this instance, fluctuation in strength and elongation increases, besides that the strength of the hot rolled steel sheet is increased to degrade the cold rolling property. Thus, the value obtained by dividing the solute Nb content of the hot rolled steel sheet by the total Nb content needs be 5% or more, preferably 15% or more, and further preferably 25% or more. Although the upper limit of the solute Nb content relative to the total Nb content is not particularly defined, it is preferred to be 70% or less from the viewpoint of ensuring the high strength.

Although the basic component composition according to the present invention has been explained above, the following optional elements may be added as necessary within respectively predetermined ranges.

<Ti: Less than 0.05%>

Similarly to Nb, Titanium (Ti) serves to form minute carbonitride to effectively refine the crystal grains and contributes to enhance strengthening, so that Ti may be contained as necessary. However, if Ti content is 0.05% or more, the formability deteriorates considerably. Thus, Ti content is defined to be less than 0.05%, and preferably 0.035% or less. In addition, if Ti is contained for increasing strength after annealing, it is preferred that Ti content is 0.005% or more.

<V: 0.10% or Less>

Similarly to Nb, vanadium (V) serves to form minute carbonitride to effectively realize minute crystal grains and contributes to enhance strengthening, so that V may be contained as necessary. However, if V content exceeds 0.10%, the effect of enhancing strength corresponding to the excessive amount beyond 0.10% is insignificant, besides that alloying cost increases. Thus, V content is defined to be 0.10% or less. In addition, if V is contained for increasing strength, it is preferred that V content is 0.005% or more.

<Cr: 0.50% or Less>

Chromium (Cr) is an element contributing to high strengthening by improving quench hardenability during annealing and forming secondary phase, and may thus be added as necessary. In order to fully achieve such an effect, it is preferred that Cr content is 0.10% or more. On the other hand, if Cr content exceeds 0.50%, a further enhancing effect is not recognized. Thus, Cr content is defined to be 0.50% or less.

<Mo: 0.50% or Less>

Molybdenum (Mo) is an element contributing to high strengthening by increasing quench hardenability during annealing and forming secondary phase, and may be added as necessary. In order to fully achieve such an effect, it is preferred that Mo content is 0.05% or more. On the other hand, if Mo content exceeds 0.50%, a further enhancing effect is not recognized. Thus, Mo content is defined to be 0.50% or less.

<Cu: 0.50% or Less>

Copper (Cu) is an element contributing to high strengthening by solid solution strengthening and also contributing to high strengthening by increasing quench hardenability during annealing and forming secondary phase, and may thus be added as necessary. In order to fully achieve such an effect, it is preferred that Cu content is 0.05% or more. On the other hand, if Cu content exceeds 0.50%, a further enhancing effect is not recognized, besides that surface defect tends to occur attributed to Cu. Thus, Cu content is defined to be 0.50% or less.

<Ni: 0.50% or Less>

Similarly to Cu, Nickel (Ni) also is an element contributing to high strengthening by solid solution strengthening and also contributing to high strengthening by increasing quench hardenability during annealing and forming secondary phase. In addition, when Ni is added with Cu, Ni has an effect on preventing surface defect attributed to Cu, so that Ni may be added as necessary. In order to fully achieve such an effect, it is preferred that Ni content is 0.05% or more. On the other hand, if Ni content exceeds 0.50%, an enhancing effect is not recognized. Thus, Ni content is defined to be 0.50% or less.

<B: 0.0030% or Less>

Boron (B) is an element contributing to high strengthening by improving quench hardenability during annealing and forming secondary phase, and may thus be added as necessary. In order to fully achieve such an effect, it is preferred that B content is 0.0005% or more. On the other hand, B content in excess of 0.0030% has the effect saturated, thus B content is defined to be 0.0030% or less.

<Ca: 0.001% to 0.005%, and/or REM:0.001% to 0.005%>

Calcium (Ca) and rare earth metal (REM) are elements, which contribute to spheroidizing sulfide shape and improving an adverse effect of sulfide on hole expansion formability, and may thus be added as necessary. In order to fully achieve such effects, it is preferred that content of these elements is defined to be 0.001% or more. On the other hand, Ca and REM contents in excess of 0.005% have these effects saturated, so that the contents of these elements are defined to be 0.005% or less, respectively.

In the chemical composition as explained above, the balance is Fe and incidental impurities. The incidental impurities are, for instance, Sb, Sn, Zn, Co, etc., and their permissible ranges are Sb: 0.01% or less; Sn: 0.1% or less; Zn: 0.01% or less; and Co: 0.1% or less. In addition, Ta, Mg and/or Zr may be contained within the range of ordinary steel composition, to the extent that the effects of the present invention are not lost.

Next, the microstructure of the hot rolled sheet according to embodiments of the present invention will be described in detail hereinafter.

The microstructure of the hot rolled sheet is characterized in that ferrite is 15 μm or less in an average crystal grain diameter and 75% or more in the volume fraction. The volume fraction as discussed herein refers to a volume fraction as related to the total steel sheet structure, and this definition is applicable throughout the following description.

When the ferrite volume fraction of hot rolled steel sheet structure is less than 75%, hard secondary phase is formed profusely to degrade the cold rolling property. Thus, the ferrite volume fraction is defined to be 75% or more. Although the upper limit of the ferrite volume fraction is not particularly defined, it is preferred to be 99% or less.

The average crystal grain diameter of ferrite in excess of 15 μm leads to forming coarsened ferrite crystal grains unevenly in the microstructure of the cold rolled steel sheet and hot-dip galvanized steel sheet after annealing, to enhance unevenness of strength and elongation properties. Thus, the upper limit of the average crystal grain diameter of ferrite is defined to be 15 μm or less. Although the lower limit of the average crystal grain diameter of ferrite is not particularly defined, it is preferred to be 3 μm or more for ensuring excellent material homogeneity of a cold rolled steel sheet and hot-dip galvanized steel sheet after annealing.

The balance phase other than ferrite is a mixed phase combining one or more kinds of low-temperature-induced phase selected from pearlite, martensite, bainite, retained austenite and spheroidized cementite. As far as the ferrite volume fraction and an average crystal grain diameter, as well as the ratio between solute Nb content and the total Nb content are satisfied, the volume fraction and the average crystal grain diameter of the balance phase are not particularly defined. However, when the hard balance phases reside profusely, the cold rolling property deteriorates. Thus, the volume fraction of the balance phase is defined to be 25% or less.

Next, the method for manufacturing a hot rolled steel sheet will be described below.

The hot rolled steel sheet according to the present invention, which is suitably utilized as the material for manufacturing a cold rolled steel sheet having high yield ratio and hot-dip galvanized steel sheet having high yield ratio, can be manufactured by a process wherein a steel slab having component composition conforming to the above component composition range is subjected to hot rolling at a starting temperature of hot rolling within a range of 1150° C. to 1270'C and at a final temperature of finish rolling not less than 900° C., followed by cooling in the temperature range down to 650° C. at an average cooling rate within a range of 20° C. /s to 90'C. /s, and then at an average cooling rate within a range of 5°C. /s to 30°C. /s down to a coiling temperature within a range of 470° C. to 640° C. for the coiling process.

In the hot rolling process, after casting a steel slab, hot rolling of the steel slab is started at a temperature within a range of 1150° C. to 1270° C. without re-heating, or after the steel slab has been re-heated to a temperature within a range of 1150° C. to 1270° C. It is preferred that the steel slab as used here is manufactured by continuous casting method so as to prevent macro segregation of the components. However, the steel slab may also be manufactured by ingot casting method or thin slab casting method.

In the present invention, in addition to a traditional method where the steel slabs is once cooled to room temperature and then re-heated, energy-saving processes are also applicable without problem, such as hot charge rolling and hot direct rolling, wherein hot steel slab is brought into a heating furnace without cooling, or steel slab is subject to rolling immediately after soaking, or steel slab just after casting is rolled as it is.

[Hot Rolling Process]

<Hot Rolling Starting Temperature: 1150° C. to 1270° C.>

If the hot rolling starting temperature is less than 1150° C., the rolling load is increased to lower the productivity. On the other hand, the hot rolling starting temperature in excess of 1270° C. leads to increased heating cost. Thus, the hot rolling starting temperature is defined to be within the range of 1150° C. to 1270° C.

<Finish Rolling Final Temperature: 900° C. or More>

In order to control strain-induced precipitation of Nb during hot rolling, the final temperature of finish rolling in the hot rolling is defined to be 900° C. or more. By controlling the strain-induced precipitation of Nb, it is possible to ensure that solute Nb content relative to the total Nb content is 5% or more in the hot rolled steel sheet after hot rolling coiling, so as to provide improved material homogeneity and cold rolling property. Thus, the final temperature of the finish rolling in the hot rolling is defined to be 900° C. or more, preferably 950° C. or more.

<Cooling in Temperature Range Down to 650° C. at Average Cooling Rate of 20° C./s to 90° C./s >

Cooling at an average cooling rate less than 20° C./s promotes precipitation of Nb and makes it difficult to obtain the desired solute Nb content, thereby degrading the material homogeneity and cold rolling property. On the other hand, cooling at an average cooling rate exceeding 90° C./s makes it difficult to ensure that ferrite transformation proceeds sufficiently in the microstructure of the hot rolled steel sheet. In this instance, the desired ferrite crystal grain diameter and volume fraction cannot be achieved, leading to degradation of the material homogeneity of an annealed sheet. Thus, it is preferred that the average cooling rate is within a range of 30° C./s to 70° C./s.

<Cooling to Coiling Temperature at Average Cooling Rate of 5° C./s to 30° C./s>

Cooling at an average cooling rate less than 5° C./s promotes precipitation of Nb such that the desired solute Nb content cannot be obtained, thereby degrading the material homogeneity and cold rolling property. On the other hand, cooling at an average cooling rate exceeding 30° C./s incurs excessive formation of hard phases, such as bainite or martensite, in the microstructure of the hot rolled sheet. In this instance, the desired ferrite crystal grain diameter and volume fraction cannot be achieved, leading to degradation of the material homogeneity and cold rolling property of the annealed sheet. Thus, it is preferred that the average cooling rate is within the range of 10° C./s to 25° C./s.

<Coiling Temperature: 470° C. to 640° C.>

When the coiling temperature is less than 470° C., the microstructure of the hot rolled sheet contains low temperature transformation phases (hard phases) such as martensite and bainite, thereby increasing the strength of the hot rolled sheet to degrade the cold rolling property.

On the other hand, if the coiling temperature exceeds 640° C., precipitation of Nb during the coiling occurs, so that the desired solute Nb content cannot be achieved, leading to degradation of the material homogeneity and cold rolling property. Thus, the coiling temperature is defined to be within the range of 470° C. to 640° C., preferably 470° C. to 550° C.

The hot rolled steel sheet manufactured through the above stated process steps is subjected to pickling and pretreatments such as degreasing as necessary, in conventional manner and then directed to cold rolling process or further hot-dip galvanizing process. At the cold rolling process, cold rolling is carried out and annealing process is then conducted. As the case may be, hot-dip galvanizing process is subsequently carried out for manufacturing a hot-dip galvanized steel sheet.

In carrying out the cold rolling, when the cold rolling reduction rate is less than 30%, ferrite recrystallization cannot be promoted during annealing and non-recrystallized ferrite remains, possibly degrading the ductility of the annealed sheet. Thus, it is preferred that the cold rolling reduction rate is 30% or more. Annealing process is preferably carried out at the temperature within a range of 750° C. to 900° C. and for a holding time within a range of 15 sec to 600 sec. In the case of annealing temperature lower than 750° C., or for a holding time less than 15 sec within a range of 750° C. to 900° C., non-recrystallized microstructure tends to remain to degrade ductility. In the case of annealing temperature exceeding 900° C., or for a holding time exceeding 600 sec within a range of 750° C. to 900° C., austenite grain tends to grow markedly, eventually forming uneven microstructure to degrade the material stability of the steel sheet.

Incidentally, in a series of heat treatments, as far as the heating history conditions are satisfied, the steel sheet may be heat-treated by means of any facilities. In addition, when the alloying process is carried out after hot-dip galvanizing, the steel sheet manufactured according to the present invention may be subjected to a temper rolling for shape correction after the alloying process.

EXAMPLES

The present invention will be described with reference to examples. However, the present invention is not restricted by any means to these examples, which may be changed appropriately within the range conforming to the purpose of the present invention, all of such changes being included within the technical scope of the present invention.

Steel having the component compositions as shown in Table 1, with the balance being Fe and incidental impurities, was molten in a converter and formed into slab by continuous casting. Each slab so obtained was subjected to hot rolling under the hot rolling conditions as shown in Table 2 (i.e., predetermined hot rolling starting temperature and finish rolling final temperature) to achieve a sheet thickness of 3.2 mm, and then to coiling at the temperature also shown in Table 2.

Next, all the hot rolled steel sheets were subjected to pickling and cold rolled under the same conditions. Namely, as cold rolling, five-time rolling (5 passes) was executed by rolls with a diameter of 500 mm for achieving a sheet thickness of 1.2 mm and the rolling load was then measured. At that time, the line load was calculated by dividing the rolling load by the sheet width for evaluating the cold rolling property of the steel sheet. The evaluations are classified as "degraded" for a steel sheet where the average line load of 5 passes is over 1.3 ton/mm, and "good" for a steel sheet where the average line load of 5 passes is 1.3 ton/mm or less. If the line load exceeds 1.3 ton/mm, a large number of passes is necessary in rolling a steel sheet to achieve a target steel thickness (particularly 1.2 mm or less), giving rise to a problem in terms of mass productivity and increased manufacturing cost due to accelerated wear of the rolls themselves. For these grounds, the standard line load was defined to be 1.3 ton/mm.

After the cold rolling, annealing at the temperature of 800° C. was carried out, and then hot-dip galvanizing or further alloying processes of zinc coating were conducted as necessary, in order to obtain cold rolled steel sheets (CR), hot-dip galvanized steel sheets (GI) and hot-dip galvannealed steel sheets (GA). For the molten bath for the hot-dip galvanized steel sheets (GI), zinc bath containing Al of 0.19 mass % was utilized. For the hot-dip galvannealed steel sheets (GA), zinc bath containing Al of 0.14 mass % was utilized. The bath temperature was 460° C. for the hot-dip galvanized steel sheets (GI) and hot-dip galvannealed steel sheets (GA) and for hot-dip galvannealed steel sheets (GA), the alloying process was carried out at 550° C. Coating weight per one side was 45 g/m$^2$ (both sides coating) and Fe concentration within a coated layer of the hot-dip galvannealed steel sheet was defined to be within the range of 9 mass % to 12 mass %.

Here, the solute Nb content of the hot rolled sheet was calculated as follows. Namely, specimens for electrolytic extraction were obtained and subjected to electrolytic treatment by means of an electrolyte consisting of 10 v/v % acetylacetone—1 w/v % tetramethylammonium chloride—methanol (AA group) so as to extract residue by filtration. Then, Nb content of the extracted residue was measured by emission spectrography of inductively coupled plasma to obtain the precipitated Nb content of Nb forming precipitation. Solute Nb content was calculated by deducting the precipitated Nb content (Nb content within Nb (C, N) precipitates) from the total Nb content that has been added.

Regarding the microstructure of the steel sheets, the ferrite volume fraction and average crystal grain diameter were quantified by etching its longitudinal section parallel to the rolling direction of the steel sheet (in the ¼ thickness position) with 3% nital reagent (3% nitric acid plus ethanol), and the vertical cross section were further observed and photographed at magnification of 500× to 1000× by an optical microscope and at 1000× to 10000× by electron microscope (scanning and transmission electron microscope) for quantifying. Twelve visual fields were observed respectively and each area fraction was measured by means of the point count method (in conformity with ASTM E562-83(1988)), the area fraction being defined to be the volume fraction. An average crystal grain diameter was calculated by cutting method in conformity with Japan Industrial Standards JIS G 0552 (1998).

The low-temperature-induced phases within the balance can be discriminated by observation using a scanning and transmission electron microscope. Namely, ferrite is contrasted slightly in black, while martensite is contrasted in white. Pearlite is a layered phase where platy ferrite and cementite are lined up in turn. Bainite is a phase containing platy bainitic ferrite having higher dislocation density than polygonal ferrite and cementite. Spheroidized cementite is cementite having a spheroidized shape.

The existence of retained austenite was determined with respect to a surface region where ¼ thickness was polished from the top surface in the depth direction, to which X-ray diffraction method was applied (equipment: RINT2200 by Rigaku Corporation). Here, Kα radiation of Mo under acceleration voltage 50 keV was used as the radiation source, and the integrated intensity of X-ray diffraction line for the iron ferrite planes of {200}, {211} and {220} and austenite planes of {200}, {220} and {311} were measured. Using the measured values, the volume fraction of retained austenite was obtained based on numerical formulae disclosed on pages 26, 62 to 64 of "*X-ray Diffraction Handbook* (2000)" published by Rigaku Corporation. The retained austenite was determined to be "recognized" in the case of volume fraction of 1% or more, and "not recognized" in the case of volume fraction of less than 1%.

Tensile test was carried out by means of JIS 5 test pieces having the tensile direction parallel to the rolling direction of the steel sheet, in accordance with JIS Z2241 (2010) for measuring YS (yield strength), TS (tensile strength), EL (total elongation) and YR (yield ratio) for the hot rolled sheets and annealed sheets (cold rolled steel sheets, hot-dip galvanized steel sheets and hot-dip galvannealed steel sheets). Regarding the material homogeneity, YS, TS and EL were measured between the sheet widthwise center and each ⅛ width position from the two opposite edges (⅛ positions within the total width) for calculating difference in characteristic values between the sheet widthwise center and the ⅛ width position (average value of the total two ⅛ width positions from the two opposite edges), by deducting the absolute value of the ⅛ width position characteristic value from the sheet widthwise center characteristic value), to obtain ΔYS, ΔTS and ΔEL, respectively. Here, YS and TS of the annealed sheets are average values within the three points, namely the sheet widthwise center and the ⅛ width positions from the two opposite edges (⅛ positions within the total width). In the present invention, when ΔYS≤40 MPa, ΔTS≤30 MPa and ΔEL≤4.0% are satisfied, the steel sheet was judged to be "good" in terms of material homogeneity. Moreover, when YR≥70% is satisfied, the steel sheet was judged to be "satisfactory" in terms of high yield ratio.

Fluctuation in material homogeneity was evaluated at the two points of the sheet widthwise center and the ⅛ width position. For instance, good stability of the steel sheet as a material in the sheet width direction cannot be evaluated sufficiently due to the difference in tensile strength between the widthwise center of a hot rolled sheet and the position corresponding to the ¼ width from the hot rolled sheet widthwise edges (¼ position within the sheet width). This is because the material around the sheet edges cannot be included for evaluation. Proper evaluation of good stability of the annealed sheet as material can be performed through additional evaluation of the difference in tensile strength between the ⅛ width position close to the sheet edges and the widthwise center. The results obtained by the above tests are shown in Table 3.

TABLE 1

| Steel type | Chemical composition (mass %) | | | | | | | | Remarks |
| --- | --- | --- | --- | --- | --- | --- | --- | --- | --- |
| | C | Si | Mn | P | S | Al | N | Nb | Other components | |
| A | 0.072 | 0.53 | 1.31 | 0.01 | 0.002 | 0.02 | 0.003 | 0.048 | — | Inventive Example |
| B | 0.091 | 0.45 | 1.52 | 0.02 | 0.003 | 0.02 | 0.003 | 0.034 | — | Inventive Example |
| C | 0.088 | 0.33 | 1.38 | 0.01 | 0.003 | 0.03 | 0.003 | 0.031 | Ti: 0.02 | Inventive Example |
| D | 0.079 | 0.24 | 1.55 | 0.02 | 0.002 | 0.03 | 0.002 | 0.024 | V: 0.05 | Inventive Example |
| E | 0.081 | 0.35 | 1.29 | 0.01 | 0.003 | 0.02 | 0.003 | 0.044 | Cr: 0.20 | Inventive Example |
| F | 0.078 | 0.51 | 1.22 | 0.03 | 0.002 | 0.03 | 0.004 | 0.068 | Mo: 0.15 | Inventive Example |
| G | 0.099 | 0.55 | 1.32 | 0.01 | 0.002 | 0.03 | 0.004 | 0.021 | Cu: 0.16 | Inventive Example |
| H | 0.069 | 0.47 | 1.41 | 0.02 | 0.003 | 0.03 | 0.003 | 0.025 | Ni: 0.19 | Inventive Example |
| I | 0.078 | 0.29 | 1.31 | 0.02 | 0.003 | 0.03 | 0.002 | 0.047 | B: 0.0014 | Inventive Example |
| J | 0.081 | 0.43 | 1.56 | 0.03 | 0.002 | 0.02 | 0.003 | 0.039 | Ca: 0.002, REM: 0.001 | Inventive Example |
| <u>K</u> | <u>0.043</u> | 0.51 | 1.43 | 0.02 | 0.003 | 0.02 | 0.004 | 0.029 | — | Comparative Example |
| <u>L</u> | 0.081 | <u>0.09</u> | 1.88 | 0.03 | 0.003 | 0.02 | 0.002 | 0.041 | — | Comparative Example |
| <u>M</u> | 0.083 | <u>0.95</u> | 1.32 | 0.03 | 0.003 | 0.02 | 0.003 | 0.034 | — | Comparative Example |
| <u>N</u> | 0.071 | 0.43 | <u>2.15</u> | 0.04 | 0.004 | 0.03 | 0.003 | 0.043 | — | Comparative Example |
| <u>O</u> | <u>0.143</u> | 0.22 | 1.47 | 0.03 | 0.004 | 0.04 | 0.003 | 0.025 | — | Comparative Example |
| <u>P</u> | 0.081 | 0.44 | <u>0.81</u> | 0.03 | 0.004 | 0.03 | 0.003 | 0.044 | — | Comparative Example |
| <u>Q</u> | 0.078 | 0.33 | 1.23 | 0.03 | 0.004 | 0.04 | 0.004 | <u>0.115</u> | — | Comparative Example |
| <u>R</u> | 0.075 | 0.56 | 1.66 | 0.02 | 0.003 | 0.04 | 0.003 | <u>0.008</u> | — | Comparative Example |

Underline means "outside the proper range according to the present invention".

TABLE 2

| No. | Steel type | Hot rolling starting temperature (° C.) | Finish rolling final temperature (° C.) | Average cooling rate to 650° C. (° C./s) | Average cooling rate to coiling temperature (° C./s) | Coiling temperature (° C.) | Remarks |
| --- | --- | --- | --- | --- | --- | --- | --- |
| 1 | A | 1230 | 960 | 35 | 18 | 500 | Inventive Example |
| 2 | A | 1230 | 980 | 35 | 18 | 480 | Inventive Example |
| 3 | A | 1200 | 980 | 35 | 15 | 550 | Inventive Example |
| 4 | A | 1230 | <u>850</u> | 30 | 20 | 550 | Comparative Example |
| 5 | A | 1200 | 960 | <u>130</u> | 20 | 480 | Comparative Example |
| 6 | A | 1180 | 960 | <u>10</u> | 20 | 500 | Comparative Example |
| 7 | A | 1200 | 960 | 40 | <u>50</u> | 480 | Comparative Example |

TABLE 2-continued

| No. | Steel type | Hot rolling starting temperature (° C.) | Finish rolling final temperature (° C.) | Average cooling rate to 650° C. (° C./s) | Average cooling rate to coiling temperature (° C./s) | Coiling temperature (° C.) | Remarks |
|---|---|---|---|---|---|---|---|
| 8 | A | 1250 | 950 | 30 | 2 | 500 | Comparative Example |
| 9 | A | 1200 | 960 | 40 | 15 | 700 | Comparative Example |
| 10 | A | 1200 | 960 | 40 | 15 | 350 | Comparative Example |
| 11 | B | 1230 | 950 | 35 | 18 | 480 | Inventive Example |
| 12 | B | 1200 | 960 | 50 | 20 | 500 | Inventive Example |
| 13 | B | 1200 | 960 | 60 | 15 | 480 | Inventive Example |
| 14 | C | 1230 | 950 | 40 | 15 | 500 | Inventive Example |
| 15 | D | 1150 | 950 | 70 | 10 | 480 | Inventive Example |
| 16 | E | 1200 | 960 | 60 | 15 | 480 | Inventive Example |
| 17 | F | 1270 | 1000 | 70 | 20 | 480 | Inventive Example |
| 18 | G | 1200 | 970 | 50 | 15 | 500 | Inventive Example |
| 19 | H | 1200 | 960 | 50 | 15 | 500 | Inventive Example |
| 20 | I | 1200 | 950 | 30 | 20 | 500 | Inventive Example |
| 21 | J | 1250 | 960 | 30 | 20 | 480 | Inventive Example |
| 22 | K | 1200 | 960 | 35 | 18 | 500 | Comparative Example |
| 23 | L | 1230 | 960 | 35 | 22 | 500 | Comparative Example |
| 24 | M | 1200 | 980 | 25 | 10 | 550 | Comparative Example |
| 25 | N | 1180 | 960 | 35 | 18 | 480 | Comparative Example |
| 26 | O | 1230 | 950 | 35 | 20 | 500 | Comparative Example |
| 27 | P | 1230 | 950 | 35 | 20 | 500 | Comparative Example |
| 28 | Q | 1230 | 960 | 25 | 10 | 550 | Comparative Example |
| 29 | R | 1200 | 970 | 35 | 25 | 500 | Comparative Example |

Underline means "outside the proper range according to the present invention".

TABLE 3

| No. | Steel type | F volume fraction (%) | Balance Phase | F average crystal grain diameter (μm) | Solute Nb in hot rolled steel sheet (%) | Cold rolling property | YS of annealed sheet (MPa) | TS of annealed sheet (MPa) | YR of annealed sheet (%) |
|---|---|---|---|---|---|---|---|---|---|
| 1 | A | 91 | P, B, SC | 8 | 30 | Good | 475 | 618 | 77 |
| 2 | A | 93 | P, M, B | 9 | 28 | Good | 461 | 631 | 73 |
| 3 | A | 94 | P, SC | 10 | 27 | Good | 459 | 611 | 75 |
| 4 | A | 80 | P, SC | 15 | 2 | Degraded | 466 | 590 | 79 |
| 5 | A | 72 | M, B, RA | 4 | 16 | Degraded | 489 | 655 | 75 |
| 6 | A | 94 | P, SC | 9 | 3 | Degraded | 458 | 593 | 77 |
| 7 | A | 73 | M, B, RA | 9 | 13 | Degraded | 478 | 611 | 78 |
| 8 | A | 90 | P, SC | 10 | 1 | Degraded | 433 | 601 | 72 |
| 9 | A | 98 | P, SC | 18 | 3 | Degraded | 433 | 576 | 75 |
| 10 | A | 71 | M, B, RA | 5 | 31 | Degraded | 456 | 638 | 71 |
| 11 | B | 90 | P, B, SC | 9 | 27 | Good | 466 | 613 | 76 |
| 12 | B | 88 | P, B, SC | 8 | 28 | Good | 471 | 622 | 76 |
| 13 | B | 83 | P, B, M, RA | 7 | 33 | Good | 488 | 610 | 80 |
| 14 | C | 89 | P, B, SC | 10 | 25 | Good | 477 | 633 | 75 |
| 15 | D | 90 | P, B, M, RA | 11 | 27 | Good | 459 | 605 | 76 |
| 16 | E | 86 | P, B, M, RA | 8 | 26 | Good | 456 | 598 | 76 |
| 17 | F | 88 | P, B, M, RA | 10 | 27 | Good | 479 | 612 | 78 |
| 18 | G | 90 | P, B, SC | 11 | 25 | Good | 466 | 631 | 74 |
| 19 | H | 91 | P, B, SC | 14 | 26 | Good | 474 | 609 | 78 |
| 20 | I | 89 | P, B, SC | 14 | 28 | Good | 486 | 611 | 80 |
| 21 | J | 95 | P, B, SC | 13 | 28 | Good | 488 | 633 | 77 |
| 22 | K | 96 | P, B, SC | 12 | 7 | Good | 415 | 532 | 78 |
| 23 | L | 73 | P, B, M, RA | 4 | 11 | Degraded | 455 | 599 | 76 |
| 24 | M | 97 | P, SC | 16 | 14 | Degraded | 465 | 603 | 77 |
| 25 | N | 74 | P, B, M, RA | 4 | 13 | Degraded | 422 | 633 | 67 |
| 26 | O | 73 | P, B, M, RA | 6 | 7 | Degraded | 451 | 611 | 74 |
| 27 | P | 92 | P, B, SC | 18 | 10 | Good | 388 | 558 | 70 |
| 28 | Q | 88 | P, SC | 5 | 3 | Degraded | 512 | 664 | 77 |
| 29 | R | 91 | P, B, SC | 20 | 15 | Good | 422 | 577 | 73 |

| No. | Characteristic difference between hot rolled sheet center and ⅛ width position | | | Characteristic difference between annealed sheet center and ⅛ width position | | | Steel sheet type | Remarks |
|---|---|---|---|---|---|---|---|---|
| | ΔYS (MPa) | ΔTS (MPa) | ΔEL (%) | ΔYS (MPa) | ΔTS (MPa) | ΔEL (%) | | |
| 1 | 22 | 15 | 3 | 13 | 11 | 2 | CR | Inventive example |
| 2 | 23 | 16 | 3 | 19 | 15 | 3 | GI | Inventive example |
| 3 | 18 | 10 | 3 | 20 | 9 | 3 | GA | Inventive example |
| 4 | 35 | 33 | 7 | 33 | 25 | 6 | GA | Comparative Example |

TABLE 3-continued

| | | | | | | | | |
|---|---|---|---|---|---|---|---|---|
| 5 | _41_ | _34_ | _6_ | _41_ | 26 | _7_ | GI | Comparative Example |
| 6 | 31 | _32_ | _5_ | 25 | _33_ | 3 | CR | Comparative Example |
| 7 | 35 | 22 | _6_ | 32 | 24 | _5_ | GA | Comparative Example |
| 8 | _41_ | _33_ | _5_ | 30 | _32_ | _5_ | CR | Comparative Example |
| 9 | _41_ | _33_ | _6_ | _42_ | _38_ | _7_ | CR | Comparative Example |
| 10 | 35 | 25 | _5_ | _43_ | 22 | _5_ | GI | Comparative Example |
| 11 | 15 | 8 | 3 | 11 | 12 | 2 | CR | Inventive example |
| 12 | 22 | 10 | 3 | 20 | 9 | 2 | GI | Inventive example |
| 13 | 18 | 12 | 3 | 15 | 10 | 3 | GA | Inventive example |
| 14 | 16 | 15 | 4 | 13 | 15 | 3 | CR | Inventive example |
| 15 | 22 | 18 | 3 | 18 | 13 | 3 | CR | Inventive example |
| 16 | 23 | 15 | 2 | 18 | 12 | 2 | CR | Inventive example |
| 17 | 18 | 11 | 3 | 15 | 10 | 3 | GI | Inventive example |
| 18 | 22 | 12 | 3 | 17 | 16 | 2 | GA | Inventive example |
| 19 | 21 | 19 | 3 | 20 | 18 | 3 | CR | Inventive example |
| 20 | 19 | 15 | 4 | 20 | 11 | 3 | CR | Inventive example |
| 21 | 22 | 18 | 3 | 20 | 20 | 3 | CR | Inventive example |
| 22 | 23 | 23 | _6_ | 22 | 21 | _5_ | GI | Comparative Example |
| 23 | _43_ | _32_ | _9_ | _41_ | _32_ | _8_ | GA | Comparative Example |
| 24 | 22 | 18 | 3 | 20 | 20 | 2 | CR | Comparative Example |
| 25 | 19 | 22 | _6_ | 15 | 16 | _5_ | GI | Comparative Example |
| 26 | 23 | _31_ | 5 | 22 | 22 | _5_ | CR | Comparative Example |
| 27 | _42_ | _33_ | _7_ | _43_ | _31_ | _6_ | GA | Comparative Example |
| 28 | _43_ | _35_ | _6_ | _45_ | _33_ | _5_ | GI | Comparative Example |
| 29 | _43_ | _36_ | _5_ | _41_ | _35_ | 4 | GI | Comparative Example |

Underline means "outside the proper range according to the present invention".
F: Ferrite,
P: Pearlite,
M: Martensite,
RA: Retained austenite,
B: Bainite,
SC: Spheroidized Cementite
CR: Cold rolled steel sheet,
GI: Hot-dip galvanized steel sheet,
GA: Hot-dip galvannealed steel sheet
Cold rolling property: "Good"-line load 1.3 ton/mm or less, "Degraded"-line load over 1.3 ton/mm It will be appreciated from Tables 1, 2 and 3 that each inventive example of the hot rolled steel sheet for manufacturing a cold rolled steel sheet or hot-dip galvanized steel sheet has given TS of 590 MPa or more for cold rolled steel sheets, hot-dip galvanized steel sheets and hot-dip galvannealed steel sheets after annealing. Such annealed sheets have high yield ratio and are excellent in material homogeneity. Also, excellent cold rolling property has been archived. On the other hand, comparative examples are inferior in at least one of tensile strength, yield ratio, material homogeneity and cold rolling property.

The invention claimed is:

1. A hot rolled steel sheet having a chemical composition including, by mass %, C: 0.060% to 0.120%; Si: 0.10% to 0.70%; Mn: 1.00% to 1.80%; P: 0.10% or less; S: 0.010% or less; Ai: 0.01% to 0.10%; N: 0.010% or less; Nb: 0.010% to 0.100%, wherein Nb is included so that content of solute Nb is 25% or more relative to the total Nb content; and the balance including Fe and incidental impurities,
the steel sheet further having a microstructure with complex phase wherein ferrite with an average crystal grain diameter within a range of not less than 3 pm to not more than 15 pm is contained at a volume fraction of not less than 75%, the balance comprising low-temperature-induced phases.

2. A hot rolled steel sheet according to claim 1, further including, by mass %, and in place of part of Fe composition, Ti: less than 0.05%.

3. A hot rolled steel sheet according to claim 1, further including, by mass %, and in place of part of Fe composition, at least one of V: 0.10% or less, Cr: 0.50% or less, Mo: 0.50% or less, Cu: 0.50% or less, Ni: 0.50% or less, and B: 0.0030% or less.

4. A hot rolled steel sheet according to claim 1, further including, by mass %, and in place of part of Fe composition, at least one of Ca: 0.001% to 0.005%, and REM: 0.001% to 0.005%.

5. A hot rolled steel sheet according to claim 1, wherein the hot rolled steel sheet is adapted to be utilized for manufacturing a cold rolled steel sheet or hot-dip galvanized steel sheet.

6. A hot rolled steel sheet according to claim 2, wherein the hot rolled steel sheet is adapted to be utilized for manufacturing a cold rolled steel sheet or hot-dip galvanized steel sheet.

7. A hot rolled steel sheet according to claim 3, wherein the hot rolled steel sheet is adapted to be utilized for manufacturing a cold rolled steel sheet or hot-dip galvanized steel sheet.

8. A hot rolled steel sheet according to claim 4, wherein the hot rolled steel sheet is adapted to be utilized for manufacturing a cold rolled steel sheet or hot-dip galvanized steel sheet.

* * * * *